United States Patent
Tsou et al.

(10) Patent No.: US 7,538,158 B2
(45) Date of Patent: May 26, 2009

(54) THERMOPLASTIC ELASTOMER COMPOSITION HAVING VISCOSITY-ENHANCED AND VULCANIZED ELASTOMER DISPERSIONS

(75) Inventors: Andy Haishung Tsou, Houston, TX (US); Yoshihiro Soeda, Kanagawa (JP); Hsien-Chang Wang, Bellaire, TX (US); Matthew Brian Measmer, Deer Park, TX (US)

(73) Assignees: ExxonMobil Chemical Patents Inc., Houston, TX (US); The Yokohama Rubber Co., Ltd., Tokyo (JP)

(*) Notice: Subject to any disclaimer, the term of this patent is extended or adjusted under 35 U.S.C. 154(b) by 316 days.

(21) Appl. No.: 10/548,059

(22) PCT Filed: Mar. 6, 2003

(86) PCT No.: PCT/US03/06701

§ 371 (c)(1),
(2), (4) Date: Sep. 26, 2006

(87) PCT Pub. No.: WO2004/081099

PCT Pub. Date: Sep. 23, 2004

(65) Prior Publication Data

US 2007/0060684 A1 Mar. 15, 2007

(51) Int. Cl.
*C08L 51/04* (2006.01)
*C08L 77/00* (2006.01)

(52) U.S. Cl. .......... 525/178; 525/179; 525/184
(58) Field of Classification Search ........... 525/178, 525/179, 184
See application file for complete search history.

(56) References Cited

U.S. PATENT DOCUMENTS 6,013,727 A 1/2000 Dharmarajan et al.

FOREIGN PATENT DOCUMENTS

| CA | 2087417 | 7/1993 |
|----|---------|--------|
| EP | 0 857 761 A1 | 8/1998 |
| EP | 0 722 850 B1 | 5/1999 |
| EP | 0 969 039 A1 | 1/2000 |
| RU | 2107701 | 3/1998 |
| WO | WO-02/31039 A1 | 4/2002 |
| WO | WO-02/31048 A1 | 4/2002 |

OTHER PUBLICATIONS

PCT International Search Report for PCT/US03/06701 mailed on Nov. 14, 2003.

*Primary Examiner*—Ana L Woodward
(74) *Attorney, Agent, or Firm*—Connolly Bove Lodge & Hutz LLP

(57) ABSTRACT

A thermoplastic elastomer composition having improved mechanical properties and fatigue resistance comprising (A) a halogenated isobutylene elastomer, (B) polyamide and (C) an amine component selected from tertiary amines and secondary diamines, wherein the elastomers are dispersed as a domain in a continuous phase of the polyamide.

8 Claims, No Drawings

THERMOPLASTIC ELASTOMER COMPOSITION HAVING VISCOSITY-ENHANCED AND VULCANIZED ELASTOMER DISPERSIONS

TECHNICAL FIELD

The present invention relates to an improved thermoplastic elastomer composition having excellent heat resistance, durability and flexibility, while possessing superior air impermeability. In particular, the present invention relates to a thermoplastic elastomer composition having viscosity-enhanced and vulcanized elastomer dispersions that have reduced particle size.

BACKGROUND ART

EP722850B1 disclosed a low-permeability thermoplastic elastomer composition that is superior as a gas-barrier layer in pneumatic tires. This thermoplastic composition comprises a low-permeability thermoplastic matrix such as polyamides or blends of polyamides, in which a low-permeability rubber such as brominated poly(isobutylene-co-p-methylstyrene), i.e., BIMS, is dispersed. Subsequently, in both EP857761A1 and EP969039A1, viscosity ratio between the thermoplastic matrix and the rubber dispersion was specified as a function of the volume fraction ratio and independently to be close to one in order to achieve phase continuity in thermoplastic and fine rubber dispersions, respectively. Criticality of smaller rubber dispersions was recognized in EP969039A1 in these thermoplastic elastomers for delivering acceptable durability especially for their usage as innerliners in pneumatic tires.

Due to the flow activation and shear thinning characteristic inherent in BIMS polymers, reductions in viscosity values of BIMS polymers at increased temperatures and shear rates encountered during mixing are much more pronounced than reductions in viscosity of the thermoplastic component with which the BIMS polymer is blended. However, minimization of the viscosity differential between the BIMS and thermoplastic components during mixing and/or processing is essential for the provision of uniform mixing and fine blend morphology that are critical for good blend mechanical properties. Considering the lower viscosity of BIMS at high shear rates, either low molecular weight grade Nylons or Nylons with plasticizers are required to match viscosities between BIMS and Nylon for providing vulcanized BIMS and Nylon blends with acceptable dispersion sizes as disclosed in EP857761A1 and EP969039A1. Both options result in the usage of Nylons with compromised mechanical performance and higher permeability.

An alternative method to more closely match the viscosity of the Nylon and BIMS at high shear rates is to enhance the viscosity of the latter component. Relying on the high reactivity of the BrPMS (i.e., brominated p-methylstyrene) group on BIMS, inter-chain associations in BIMS could be introduced through conversion of BrPMS to various strong inter-acting groups to raise the apparent molecular weights of BIMS and its viscosity. Another method for viscosity enhancement in BIMS is simply to partially crosslink BIMS with some types of curatives (see EP969039A1). However, all methods in increasing the viscosity of BIMS involve reactive conversion of BrPMS group to other groups and, hence, remove it from reactive compatibilization with Nylon in blending and from participation in curing. Therefore, in using a viscosity-enhancement additive for BIMS in thermoplastic resins, which are capable of interacting with bromine, it is critical to select additives that could raise the viscosity of BIMS to that of Nylon with minimal amounts of addition and with minimal, preferably no, effects on reactive compatibilization and cure.

Since the strongest chain associations could be brought upon with either ionic interactions or covalent bonding, a maximum increase in the viscosity of BIMS with a minimum addition of any additive dictates the usage of either tertiary, amines or crosslinkers. Depending on the alkyl chain length and number in tertiary amines, ionic associations could be tailored to raise the viscosity of BIMS to a desirable level with minimal compromises in the properties of BIMS. Among all tertiary amines, dimethyl alkyl amines are most suitable. The alkyl group provides the partial solubility in BIMS, whereas the dimethyl group presents no steric hindrance for ionic associations. Steric restrictive secondary diamines with alkyl end groups are the effective crosslinker for the viscosity enhancement of BIMS. Steric hindrance of the secondary amine in these crosslinkers limits their crosslinking efficiency to prevent gelation, whereas the alkyl end group provides the solubility.

SUMMARY OF THE INVENTION

The object of the present invention is to provide a thermoplastic elastomer composition having improved impermeability and excellent mechanical properties at a low temperature and fatigue resistance.

In accordance with the present invention, there is provided a thermoplastic elastomer composition having improved mechanical properties and fatigue resistance comprising a dynamically vulcanized blend of (A) a halogenated isobutylene elastomer, (B) polyamide and (C) an amine component selected from the group consisting of tertiary amines, secondary diamines, and mixtures of tertiary amines and diamines, wherein the elastomers are dispersed as a domain in a continuous phase of the polyamide.

DISCLOSURE OF THE INVENTION

In this specification and in the claims which follow, the singular forms "a", "an" and "the" include plural referents unless the context clearly dictates otherwise.

The present invention relates to a thermoplastic elastomer composition, more particularly relates to a thermoplastic elastomer composition excellent in durability and in impermeability. The present invention is directed to raise the viscosity of the halogenated isobutylene elastomers to be similar to that of the polyamides through quaterinized amine ionic associations using tertiary amines or covalent bonding with secondary diamines in BIMS. Most specifically, the present invention relates to a process for producing a thermoplastic elastomer composition capable of providing a rubber domain having a small particle size where the number average equivalent domain diameter ranges from 0.1 to 1 micron, without the usage of low molecular weight Nylons or Nylons, with plasticizers, while having highly extensible and elastic rubber domains and a process for producing a pneumatic tire using the same.

The preferred halogenated isobutylene elastomers are brominated polymers where brominated p-methylstyrene-co-isobutylene polymers are most preferred followed by bromobutyl and followed by blends thereof with each other or other polymers (see U.S. Pat. No. 5,162,445).

The preferred tertiary amines are partially hindered amines from the family of the structure (I):

where $R^1$ is longer hydrocarbons with 4 to 30 carbons, most preferably 12 to 30 carbons, and $R^2$ and $R^3$ are independently a shorter hydrocarbon with 1 to 8 carbons, most preferably 1 to 4 carbons (e.g., N,N-dimethyllaurylamine, N,N-dimethylpalmitylamine, N,N-dimethylbehenylamine, N,N-dimethyltallowalkylamine, N,N-dimethyloleylamine). The other preferred diamines are steric hindered secondary diamines from the family of the structure (II):

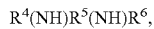
$R^4(NH)R^5(NH)R^6$, where $R^4$ and $R^5$ are carbon rings, either saturated rings (e.g., cyclohexyl, cyclopentyl) of 5 to 12 carbons or aromatic rings of benzene and naphthalene, and $R^6$ is a linear or branched alkyl group with 4 to 30 carbons. The above rings may be substituted with, for example, 4,4'-((2,2-dimethylbenzyl) phenyl, methylphenyl).

These amines are known in the art and also are commercially available (e.g., Armeen DM14D, Armeen DM16D, Armeen DMCD, Armeen M2C, Armeen M2HT from Akzo Nobel).

The preferred amine, either tertiary amine or diamine, level is from 0.01 to 1.0 mole amine equivalents, preferably 0.01 to 0.9 mole equivalents, more preferably 0.01 to 0.8 mole equivalents, still more preferably 0.01 to 0.7 mole equivalents, further more preferably 0.01 to 0.6 mole equivalents, and most preferably 0.01 to 0.5 mole equivalents,. based upon 1 mole of the bromine bonded to the elastomer (A).

The thermoplastic elastomer composition is a blend of a halogenated isobutylene elastomer and a polyamide, which is subjected to dynamic vulcanization.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional thermoplastic resin processing techniques such as extrusion, injection molding, compression molding, etc. Scrap or flashing can be salvaged and reprocessed.

In a preferred embodiment the halogenated isobutylene elastomer component include copolymers of isobutylene and para-alkylstyrene, such as described in European Patent Application 0 344 021. The copolymers preferably have a substantially homogeneous compositional distribution. Preferred alkyl groups for the para-alkyl styrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene.

Suitable halogenated isobutylene elastomer components include copolymers (such as brominated isobutylene-paramethylstyrene copolymers) having a number average molecular weight Mn of at least about 25,000, preferably at least about 50,000, preferably at least about 75,000, preferably at least about 100,000, preferably at least about 150,000. The copolymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 25 or more, preferably 30 or more, more preferably 40 or more.

Preferred brominated copolymers of isobutylene and paramethylstyrene include those having 5 to 12 weight % paramethylstyrene, 0.3 to 1.8 mol % brominated para-methylstyrene, and a Mooney viscosity of 30 to 65(1+4) at 125° C. (as measured by ASTM D 1646-99).

The halogenated isobutylene elastomer component (A) according to the present invention can be prepared from isobutylene and about 0.5 to 25% by weight, preferably about 1 to 20% by weight, based upon the total amount of the comonomers, of p-alkylstyrene, preferably p-methylstyrene, followed by the halogenation. Typically, the sturry polymerization of the monomer mixture is carried out in the presence of a Lewis acid catalyst and the subsequent halogenation is carried out in the presence of a radical initiator such as heat and/or light or a chemical initiator in the form of a solution. The content of the halogen (e.g., Br and/or Cl, preferably Br) is preferably less than about 10% by weight, more preferably about 0.1 to about 7% by weight, based upon the total amount of the copolymer.

The copolymerization can be carried out in a known manner as described in, for example, European Patent Publication No. EP-034402/1A published Nov. 29, 1989 and the halogenation can be carried out in a known method as described in, for example, U.S. Pat. No. 4,548,995.

The halogenated isobutylene elastomer preferably has the number-average molecular weight (Mn) of at least about 25,000, more preferably at least about 100,000 and a ratio of the weight-average molecular weight Mw to the number-average molecular weight (Mn), i.e., Mw/Mn of preferably less than about 10, more preferably less than about 8.

The polyamides usable in the present invention are thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (Nylon 6), polylauryllactam (Nylon 12), polyhexamethyleneadipamide (Nylon-6,6), polyhexamethyleneazelamide (Nylon-6,9), polyhexamethylenesebacamide (Nylon-6,10), polyhexamethyleneisophthalamide (Nylon-6, IP) and the condensation product of 11-amino-undecanoic acid (Nylon 11). Nylon 6 (N6), Nylon 11 (N11), Nylon 12 (N12), a Nylon 6/66 copolymer (N6/66), Nylon 610 (N610), Nylon 612 (N612) may also be used. The copolymers thereof and any blends thereof may also be used. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention, with linear crystalline polyamides having a softening point or melting point between 160° C.-230° C. being preferred.

The amount of the polyamide (B) usable in the present invention is preferably 5 to 75 parts by weight, more preferably 10 to 75 parts by weight, based upon 100 parts by weight of the elastomer (A).

The elastomer composition according to the present invention may contain, in addition to the above-mentioned essential ingredients, a vulcanization or cross-linking agent, a vulcanization or cross-linking accelerator, various types of oils, an antiaging agent, reinforcing agent, plasticizer, softening agent, or other various additives generally mixed into general rubbers. The compounds are mixed and vulcanized by general methods to make the composition which may then be used for vulcanization or cross-linking. The amounts of these additives added may be made the amounts generally added in the past so long as they do not run counter to the object of the present invention.

EXAMPLE

The present invention will now be further illustrated by, but is by no means limited to, the following Examples.

The following commercially available products were used for the components employed in the Examples.

Resin Component
N11 (i.e., Nylon 11): Rilsan BESN O TL (Atochem)
N6/66-1 (i.e., Nylon 6/66 copolymer):
Ube 5033B (Ube)
N6/66-2 i.e.,: Ube 5034B (Ube)
N6/66-3 i.e.,: CM6001FS (Toray)
Additive 1: Plasticizer: N-butylbenzenesulfonamide and compatibilizer:AR201
Additive 2: Stabilizer: Irganox 1098, Tinuvin 622LD, and CuI
Rubber Component
BIMS: Brominated copolymer of isobutylene and para-methylstyrene sold under the tradename EXXPRO 89-4 by ExxonMobil Chemical Company having a mooney viscosity of about 45, approximately 5 weight % para-methylstyrene and about 0.75 mol % bromine
DMCD: N,N-dimethyl cocoalkyl amine (Akzo Nobel)
DM16D: N,N-dimethyl palmityl amine (Akzo Nobel)
DM18D: N,N-dimethyl stearyl amine (Akzo Nobel)
DMHTD: N,N-dimethyl hydrogenated tallowalkyl amine (Akzo Nobel)
DM22D: N,N-dimethyl behenyl amine (Akzo Nobel)
M2C: Dicocoalkyl-methylamine (Akzo Nobel)
M2HT: Dihydrogenated tallowalkyl-methylamines (Akzo Nobel)
6PPD: N-(1,3-dimethylbutyl)-N'-phenyl-p-phenylenediamine
ZnO: Zinc oxide curative
St-acid: Stearic acid curative
ZnSt: Zinc sterate curative The test methods used for evaluation of the Examples and Comparative Examples were as follows:

A) Oxygen Permeability by Mocon

The oxygen permeation measurements were done using a Mocon OX-TRAN 2/61 permeability tester at 60° C.

B) Morphology (Tapping Phase and Force Modulation AFM)

All specimens were analyzed within 8 hours after cryofacing to prevent specimen relaxation. During cryofacing, the specimens were cooled to −150° C. and cut with diamond knives in a Reichert cryogenic microtome. They were then stored in a dessicator under flowing dry nitrogen gas to warm up to ambient temperatures without condensation being formed. Finally, the faced specimens were mounted in a miniature steel vice for AFM analysis. The AFM measurements were performed in air on a NanoScope Dimension 3000 scanning probe microscope (Digital Instrument) using a rectangular Si cantilever. While the set point ratio is maintained at a value equal to or lower than 0.5, the contact set point was adjusted routinely to ensure repulsive contacts with positive phase shifts. The cantilever was running at or slightly below its resonance frequency.

C) Dispersion Sizes by Image Processing

Images of tiff format were processed using PHOTOSHOP and plug-in functions from Reindeer Graphics, Inc. and BIMS dispersion sizes in each sample were measured and written into EXCEL data files. In this study, the dispersion size is expressed by the equivalent diameter. Number average (Dn) and volume average (Dv) diameters are calculated according to:

$$Dn = \Sigma(n_1 D_1)/\Sigma(n_1) \quad (1)$$

$$Dv = \Sigma(n_1 D_1^4)/\Sigma(n_1 D_1^3) \quad (2)$$

Here, $n_1$ is the number of dispersion with equivalent diameter of $D_1$.

D) Fatigue Cycles

Film and a carcass compound were laminated together with an adhesive and cured at 190° C. for 10 min. A JIS No. 2 dumbbell shape was then punched out and used for durability test at −20° C. at 6.67 Hz and 40% strain.

E) Tensile Mechanical Properties

All tensile tests are based on JIS K6251 "Tensile Test Method of Vulcanized Rubber".

Examples 1-3

In Example 1 (i.e., Reference formulation), a plasticizer was added in the blend of N11 and N6/66-1 to lower the viscosity of the Nylon blend to that of BIMS at 220° C. and 1000 1/s shear rate. Fine dispersions were obtained in this vulcanized blend. Without the plasticizer, the viscosity of Nylon 6/66-2 at 220° C. and 1000 1/s shear rate is 742 Pa·s, whereas that of BIMS is 200 Pa·s. By adding 1.8 phr (i.e., per one hundred rubber) of DM16D tertiary amine as shown in Example 3, the viscosity of BIMS was raised to that of N6/66-2. As shown in Table 1, without the plasticizer and without the viscosity modifier of DM16D, the viscosity of BIMS is so much lower than that of N6/66-2 that a poor mixing quality was obtained. Morphology of a continuous Nylon matrix with rubber dispersions could not be attained in this case. However, as shown in Table 1, the addition of DM16D in BIMS for viscosity matching with Nylon delivers a fine rubber dispersion morphology in Nylon matrix with a dispersion size similar to that of Example 1. In addition, without the presence of plasticizer and compatibilizer, the oxygen permeability of Example 3 is less than half of that of Example 1.

TABLE 1

| | Example | | |
|---|---|---|---|
| | 1 (Reference) | 2 (Comparative) | 3 |
| BIMS | 100 | 100 | 100 |
| DM16D | — | — | 1.8 |
| ZnO | 0.15 | 0.5 | 0.5 |
| St-acid | 0.60 | 0.75 | 0.75 |
| ZnSt | 0.30 | — | — |

TABLE 1-continued

|  | Example | | |
| --- | --- | --- | --- |
|  | 1 (Reference) | 2 (Comparative) | 3 |
| N6/66-1 | 28 | — | — |
| N6/66-2 | — | 100 | 100 |
| N11 | 40 | — | — |
| Additive 1 | 21 | 0 | 0 |
| Additive 2 | 0.5 | 0.5 | 0.5 |
| Morphology*[1] | Rubber Dispersions | Co-Continuous | Rubber Dispersions |
| Dn*[2] | 0.37 micron | Cannot measure | 0.4 micron |
| Permeability*[3] | 12 | 8 | 5 |

*[1]Morphology was examined using tapping phase AFM (Nano Scope Dimension 3000): Digital Instrument.
*[2]The number average equivalent diameter of rubber dispersions calculated from tapping phase AFM a morphological images of the sample.
*[3]Permeability was determined based on the oxygen transmission rate at 60° C. in a unit of cc · mil/($m^2$ · day · mmHg) as measured by a Mocon permeation tester (MOCON OX-TRAN 2/61 (oxygen permeability tester)).

Example 4

To evaluate the effect of tertiary amine on rubber and blend properties, Example 4 with identical formulation as that of Example 1 except the addition of 0.5 phr of DM16D tertiary amine was prepared. As shown in Table 2, the addition of tertiary amine has beneficial effects on blend properties where elongation to break values are raised at all temperatures. Fatigue cycles were measured on the tensile specimen at −20° C.

TABLE 2

|  | Example No. | |
| --- | --- | --- |
|  | 1 (Reference) | 4 |
| Formulation (wt. part) | | |
| BIMS | 100 | 100 |
| DM16D | — | 0.5 |
| ZnO | 0.15 | 0.15 |
| St-acid | 0.60 | 0.60 |
| ZnSt | 0.30 | 0.30 |
| N6/66-1 and N11 | 68 | 68 |
| Additive 1 | 21 | 21 |
| Additive 2 | 0.5 | 0.5 |
| Properties | | |
| −20° C. Strength (MPa)*[1] | 37 | 34 |
| −20° C. Elongation (%) | 443 | 456 |
| 25° C. Strength (MPa) | 17 | 21 |
| 25° C. Elongation (%) | 377 | 442 |
| 60° C. Strength (MPa) | 13 | 16 |
| 60° C. Elongation (%) | 347 | 395 |
| Fatigue cycles (×$10^6$) | 1.3-3.5 | 1.3-2.0 |

*[1]All tensile results are reported as averages of measurements along the machine and transverse directions.

Viscosity values of BIMS containing 0.5 phr of DM16D, DM18D, DM22D, and 6PPD at 230° C. and at 1216 1/s shear rate are listed in Table 3 measured using a capillary rheometer. The 0.5 phr amount for all four amines listed are below the 0.2 mole equivalent of bromine in BIMS whereas the 1 phr amount for these amines are below 0.3 mole equivalent of bromine in BIMS. As indicated from Table 3, the viscosity value of BIMS was raised from 200 Pa·s to 530-575 Pa·s with 0.5 phr of amines, similar to that of the blend of N6/66-1 and N11 as shown in Example 1, and to 600 to 800 Pa·s with 1 phr of amines, similar to that of N6/66-2.

TABLE 3

|  | DM16D | DM18D | DM22D | 6PPD |
| --- | --- | --- | --- | --- |
| 0.5 phr | 539 | 531 | 544 | 575 |
| 1.0 phr | 668 | 702 | 619 | 790 |

During mixing of Nylon and BIMS in an extrusion mixer, the residence time is in minutes. Viscosity matching in the mixer for developing fine dispersion morphology needs to be established immediately in the extruder. Hence, any viscosity enhancer used to raise the BIMS viscosity has to be fast acting. To evaluating the effectiveness of various tertiary amines, 0.1 mole bromine equivalents of selective amines were added into BIMS after it was stabilized in a Brabender internal mixer (PL 2000 Plasti-Corder: C:W, Brabender) for a minute at 130° C. Using the measured torque value, the onset of viscosity enhancement was determined from the onset of the torque increase after the addition of the amine at 130° C. 130° C. was used as the mixing temperature, 100° C. less that the 230° C. used for mixing of Nylon and BIMS, is to slow down the activation to a management point that one can measure the onset time. As shown in Table 4, dimethyl alkyl amines have onset times of less than 30 seconds. No increases in mixing torque was found in dialkyl methyl amines at 130° C.

TABLE 4

| Tertiary Amine | Onset Time (second) | Final Torque/Initial Torque |
| --- | --- | --- |
| DMCD | 8 | 1.13 |
| DM16D | 14 | 1.04 |
| DMHTD | 18 | 1.16 |
| M2C | Cannot measure | <1 |
| M2HT | Cannot measure | <1 |

Examples 5-8

In a dynamically vulcanized blend of plasticized N6/66-1 and N11 with BIMS as shown in Example 1, DM16D tertiary amine was added in Examples 5-7 with increasing amounts but without the Nylon plasticizer. Fine dispersions, as shown in Example 5, could be attained in the dynamically vulcanized blend of Nylon with BIMS containing DM16D, but without the presence of plasticizer. However, dispersion size, especially the volume-average equivalent dispersion diameter of BIMS, increases with increasing DM16D amount suggesting that the addition of tertiary amine is interfering with the reactive compatibilization between BIMS and Nylon especially at higher amount. Hence, it is desirable to limit the amount of viscosity enhancer added in Nylon/BIMS blends.

TABLE 5

|  | Example | | | | |
| --- | --- | --- | --- | --- | --- |
|  | 1 (Reference) | 5 | 6 | 7*[1] | 8*[1] |
| Formulation (Part by weight) | | | | | |
| BIMS | 100 | 100 | 100 | 100 | 100 |
| DM16D | — | 0.5 | 1 | 2 | 3 |
| ZnO | 0.15 | 0.15 | 0.15 | 0.15 | 0.15 |
| St-acid | 0.60 | 0.60 | 0.60 | 0.60 | 0.60 |
| ZnSt | 0.30 | 0.30 | 0.30 | 0.30 | 0.30 |

TABLE 5-continued

| | Example | | | | |
|---|---|---|---|---|---|
| | 1 (Reference) | 5 | 6 | 7*1 | 8*1 |
| N6/66-1 and N11 | 68 | 95 | 95 | 95 | 95 |
| Additive 1 | 21 | 0 | 0 | 0 | 0 |
| Additive 2 | 0.5 | 0.7 | 0.7 | 0.7 | 0.7 |
| Property | | | | | |
| Dn (micron) | 0.37 | 0.49 | 0.6 | 0.65 | 0.46 |
| Dv*2 (micron) | 2.07 | 0.91 | 1.6 | 4.85 | 5.96 |
| Fatigue cycles (×10$^6$) | 1.3-3.5 | 1.7-2.8 | 1.3 | 0.4 | 0.1 |

*1Comparative Example
*2The volume average equivalent diameter of BIMS dispersions calculated from the tapping phase AFM morphological images of the sample. Volume average is based on the following equation: $Dv = \Sigma(n_i D_i^4)/\Sigma(n_i D_i^3)$
where
$D_i$ is the equivalent diameter of individual dispersion and $n_i$ is the number of the dispersion with an equivalent diameter of $D_i$.

Examples 9 and 10

Further demonstration of the usefulness of DM16D and 6PPD could be found in Table 6 where BIMS was blended directly with N6/66-3. As indicated in Example 2, without the addition of viscosity enhancers in BIMS, these blends with small BIMS dispersions could not have been possible. As shown in Table 6, fine BIMS dispersion sizes were obtained with excellent mechanical properties and fatigue resistance.

TABLE 6

| | Example | |
|---|---|---|
| | 9 | 10 |
| Formulation (wt. part) | | |
| BIMS | 100 | 100 |
| 6PPD | 0.5 | 0 |
| DM16D | 0 | 1.0 |
| ZnO | 0.15 | 0.15 |
| St-acid | 0.60 | 0.60 |
| ZnSt | 0.30 | 0.30 |
| N6/66-3 | 98 | 98 |
| Additive 1 | 0 | 0 |
| Additive 2 | 0.75 | 0.75 |
| Properties | | |
| −20° C. Strength (MPa)*1 | 47 | 52 |
| −20° C. Elongation (%) | 280 | 353 |
| 25° C. Strength (MPa) | 32 | 36 |
| 25° C. Elongation (%) | 320 | 343 |
| Fatigue cycles (×10$^6$) | 1.0-2.0 | 0.5-1.5 |

*1All tensile results are reported as averages of measurements along the machine and transverse directions.

The invention claimed is:

1. A thermoplastic elastomer composition having improved mechanical properties and fatigue resistance comprising a dynamically vulcanized blend of (A) a halogenated isobutylene elastomer component, (B) a polyamide component, (C) an amine component comprising a mixture of tertiary amines and diamines, the elastomer (A) being dispersed as a domain in a continuous phase of the polyamide (B) and the amine component is present in the composition in an amount such that the viscosity of the isobutylene elastomer in combination with the amine component is similar to the viscosity of the polyamide component during dynamic vulcanization.

2. A thermoplastic elastomer composition as claimed in claim 1, further containing a plasticizer.

3. A thermoplastic elastomer composition as claimed in claim 1, wherein the amount of the halogenated isobutylene elastomer is 95 to 25 parts by weight of the blend and the amount of the polyamide is 5 to 75 parts by weight of the blend.

4. A thermoplastic elastomer composition as claimed in claim 1, wherein the amount of the amine component is 0.01 to 1.0 mole amine equivalent, based upon 1 mole of the halogen bonded to the elastomer (A).

5. A thermoplastic elastomer composition as claimed in claim 1, wherein the hydrogenated isobutylene elastomer is brominated poly(isobutylene-co-p-methylstyrene).

6. A thermoplastic elastomer composition as claimed in claim 1, wherein the polyamide is at least one member selected from the group consisting of Nylon 6, Nylon 66, Nylon 11, Nylon 69, Nylon 12, Nylon 610, Nylon 612, Nylon 48, Nylon MXD6, Nylon 6/66 and the copolymers thereof.

7. A thermoplastic elastomer composition as claimed in claim 1, wherein the tertiary amine has the structure (I):

$$(R^1 R^2 R^3)N \qquad (I)$$

wherein $R^1$ is a hydrocarbon group having 4 to 30 carbon atoms and $R^2$ and $R^3$ are independently a hydrocarbon group having 1 to 8 carbon atoms.

8. A thermoplastic elastomer composition as claimed in claim 1, wherein the diamine has the structure (II):

$$R^4(NH)R^5(NH)R^6 \qquad (II)$$

wherein $R^4$ and $R^5$ are independently carbon rings and $R^6$ is an alkyl group with 4 to 10 carbon atoms.

* * * * *